United States Patent [19]
Armanno, Sr.

[11] Patent Number: 5,671,568
[45] Date of Patent: Sep. 30, 1997

[54] HURRICANE SHELTER

[76] Inventor: Frank Armanno, Sr., 14399 Picea Ct., Fort Pierce, Fla. 34951

[21] Appl. No.: 753,275

[22] Filed: Nov. 22, 1996

[51] Int. Cl.$^6$ .................................................. E04H 9/00
[52] U.S. Cl. .................. 52/66; 52/79.1; 52/80.1; 135/98; 135/99; 135/16
[58] Field of Search .................. 52/66, 79.1, 80.1; 135/98, 99, 96, 16, 900–902, 20.3

[56] References Cited

U.S. PATENT DOCUMENTS

| | | |
|---|---|---|
| 592,190 | 10/1897 | Bond . |
| 2,792,794 | 5/1957 | Miller ........................................ 52/66 X |
| 4,132,236 | 1/1979 | Petersen et al. ............................ 135/16 |

Primary Examiner—Robert Canfield

[57] ABSTRACT

A hurricane shelter generally comprising a dome shaped cover and a cylindrically shaped base wall, designed to be sufficiently small and aesthetically pleasing to enable it to be located without difficulty near a home or a trailer and provide quick access to needed shelter in times of emergency. At other times, the dome can be raised on its own central column above the base wall to form an umbrella-like covering over the base wall. The column is designed to support a table top, making it possible to convert this safety structure into a shaded outdoor table, or in the case of a large shelter unit, into a gazebo, a useful addition to a home throughout the entire year in areas subject to hurricanes.

25 Claims, 2 Drawing Sheets

U.S. Patent    Sep. 30, 1997    Sheet 1 of 2    5,671,568
FIG. 1
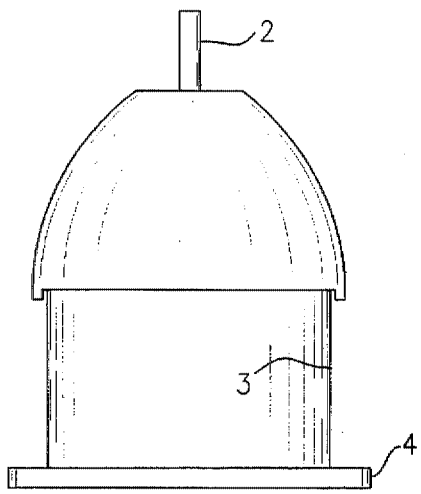
FIG. 3
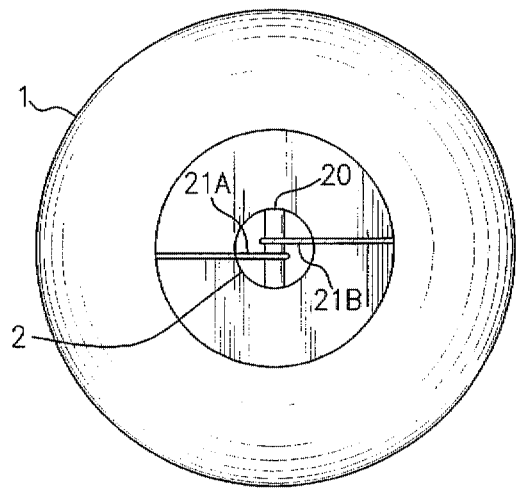
FIG. 4A
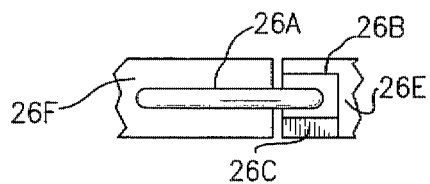
FIG. 5A    FIG. 5B
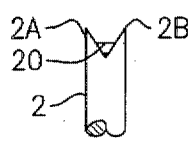 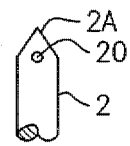
FIG. 4B    FIG. 4C
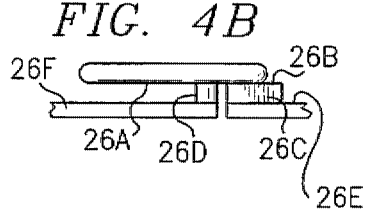 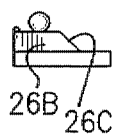

HURRICANE SHELTER

PRIOR ART

The accuracy and frequency of hurricane warnings in recent years has improved greatly. Storms that are likely to turn into hurricanes are detected early. Those that do turn into hurricanes are tracked past land fall until they dissipate to a point at which they are no longer considered to be dangerous. This generally has resulted in the saving of many lives, but despite the improvement in hurricane warnings, there are still many problems associated with hurricanes that have not been solved. For example in some cases, a hurricane can make a rapid change in direction shortly before making land fall, resulting in an area being classified as being directly in the path of the hurricane that was not originally considered to be in such serious danger. This leaves the residents of such an area with a number of serious problems. Under such circumstances, it is difficult to escape the area because of clogged roads resulting from the large number of people trying to exit the area at the same time. Being on the road when a hurricane strikes can be one of the most dangerous possible locations to be in. Loss of life in such a location is expected to be very high.

If a resident is fortunate enough to escape the area in time to avoid the hurricane, his problems are not entirely over. There is the possibility of property loss from the storm and also from another source. Unfortunately at such times, there are often looters who take advantage of the many vacant homes and the scarcity of law enforcement officials who, understandably in such an emergency, are primarily concerned with traffic and the safe evacuation of the residents.

Most homes in areas affected by hurricanes were built prior to recently adopted hurricane building standards and many are not expected to experience hurricane force winds without damage. In addition, the vast majority of premanufactured homes and trailers are generally not built to withstand such wind forces. Enforced evacuation of such homes by local authorities in the event of a hurricane is virtually certain as are the attending problems associated with such an evacuation. It would be desirable for the home owner to have a shelter quickly accessible from his home to avoid such problems and above all to safeguard his life and that of his family. To obtain such a shelter for such homes and trailers at the present time typically requires the owner to rebuild part of his home or make an addition to his home that meets the standards of the new hurricane building codes. Such an addition is expensive and generally prohibitive for most affected home owners. In addition, many structures are not amenable to upgrading to the new hurricane standards, and other homes, which are located on relative small lots, cannot accommodate an addition, making a conventional home shelter virtually impossible in many instances. Described in the following specifications is an alternative solution which overcomes the high cost and the numerous other problems associated with prior an home hurricane shelters.

BRIEF DESCRIPTION OF THE DRAWINGS

FIG. 1 is an outline drawing of the present invention with a dome used to cover the safety shelter shown in it's lower position.

FIG. 3 is a top view of the present invention.

FIGS. 4A through 4C are a top, side and end view respectively of a securing device for the dome and an access door located in a base wall of the safety shelter.

Figure 2:
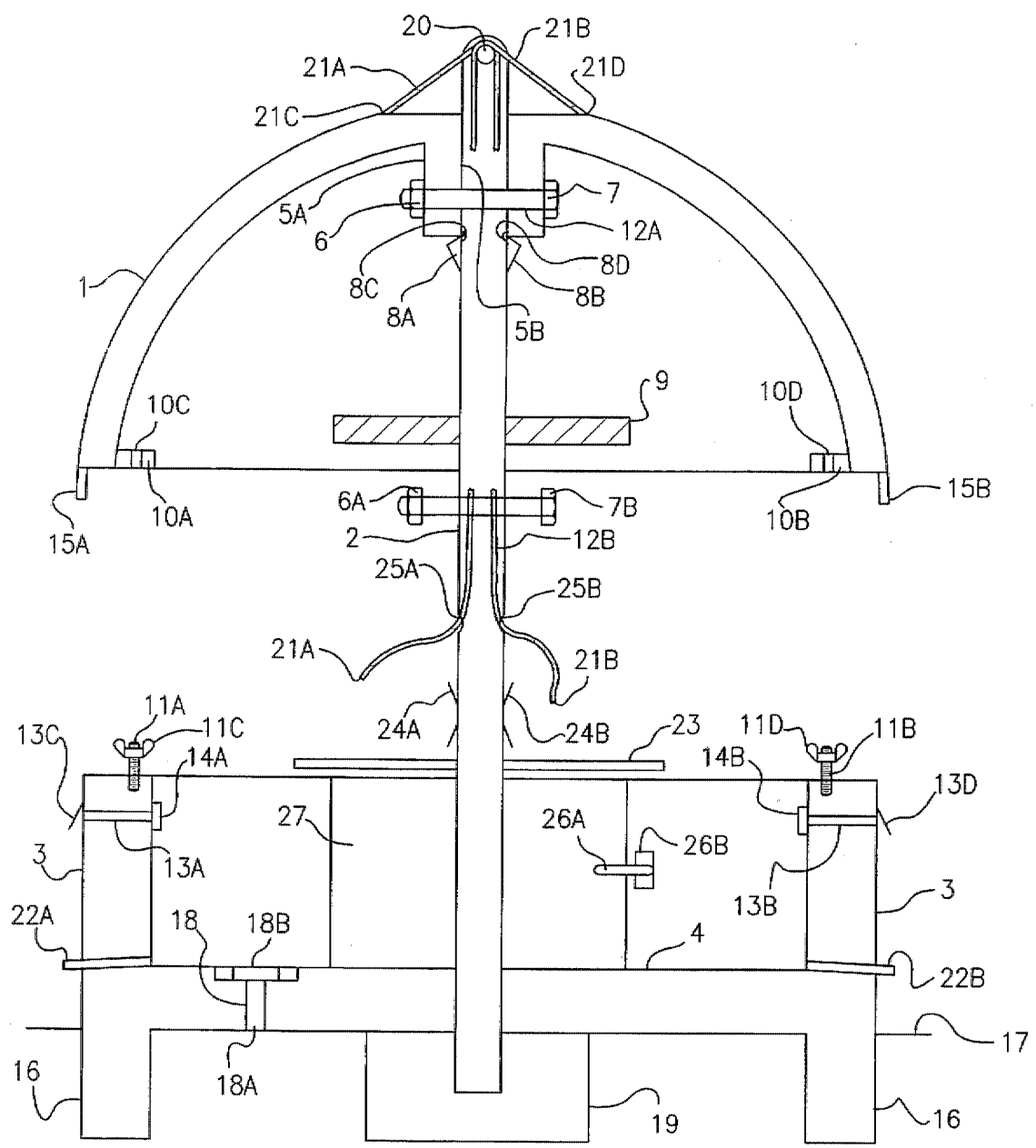
FIG. 2 is a cross sectional view of the present invention with the dome raised to it's upper position.

5A is a side view of an embodiment of the present invention in which the top of a column supporting the dome is cut to form a triangular shape to accommodate lines passing out from the top of the column to the dome.

FIG. 5B is a front view of the column cut as described in connection with FIG. 5A.

SUMMARY OF THE INVENTION

The present invention generally consists of a foundation, a base wall, a dome, and a central column. The dome rests on the base wall and provides shelter in an internal safe space for use in times of emergency, while the central column enables the dome to be raised and locked in its upper position well above the base wall to provide access to the safe space. When there is no storm emergency, the upper position of the dome provides the shade for a table produced by placing a table top over the base wall or attaching a table top to the central column.

The base wall, in a preferred embodiment, forms a circle in plan view, matching in size the diameter of the lower portion of the dome which rests on this wall. The circular base and the dome shaped cover provide low resistance to the winds and are aesthetically attractive as well. To provide the strength to resist the force of hurricane winds, the base wall is connected to the foundation which is typically located on or below ground level. The foundation is usually constructed of heavy material such as concrete, and if desired, even greater strength and weight can added by including a footing for the foundation.

The column is centrally located in the foundation. The foundation provides support for holding the column in an erect position; however, additional strength for supporting the column is provided by extending the column below the foundation into the earth. The base wall is typically fabricated from masonary, but also can also be fabricated from other suitable materials such as aluminum, steel or high impact plastic. The central column is typically fabricated from steel, but also can be fabricated from a high strength aluminum alloy or other suitable high strength materials.

The base wall includes studs for latching or dog type latching devices to secure the dome to the base wall in the event of a hurricane. When either studs or dogs are used, both are exposed inside the dome to enable the occupants to carry out the securing operation after they have entered the shelter. In a preferred embodiment, the dome includes a window to permit light from the outside to enter and light the space within the dome as well as to permit the occupants to view weather conditions outside the dome. The base wall includes side air vents for ventilation and the foundation includes a drain port for draining off any water accumulated within the shelter.

The material chosen for the dome is important because it must protect the occupants of the shelter against flying debris, such as that caused by broken tree branches or lumber torn from buildings and made airborne by the high velocity wind. Extensive testing has been carried out to identify materials capable of withstanding the high impact produced by flying debris. With the exception of masonary, all those material listed above as satisfactory for the base wall are also suitable for the dome. Included in this group is high impact plastic and among the suitable high impact plastics is a clear plastic which has been selected for the dome window.

DETAILED DESCRIPTION OF THE INVENTION

FIG. 1 shows the hurricane shelter of the present invention to include a dome 1 lowered onto a base wall 3, which rests on a slab foundation 4. A slab foundation can rest on the ground or for better anchoring may be partially located or totally located in the ground. The position of the dome in FIG. 1 is referred to as the dome's lower position. The dome is guided into its lower position on the base wall by a centrally located, vertical column 2. It can be seen in FIG. 1 that the dome 1 has a slightly larger diameter than the base, allowing the dome to extend slightly outward and downward over the base wall to direct rain water from the dome away from the base wall, thereby aiding in maintaining the inside of the shelter dry during storms.

FIG. 2 shows a cross section of the dome, base wall and foundation. The base wall in this Figure rests on an alternative type of foundation which differs from that shown in FIG. 1 in that it contains a footing 16 that lies underneath the base wall and extends below the grounds surface 17. Also, the dome is raised to what is referred to herein as the dome's upper position and locked in place. Typically the dome is three to five feet above the base wall in this position. The upper position of the dome provides access to the safe space within the base wall in times of emergency and at other times permits use of the structure as an umbrella covered table. The footing portion of the foundation shown in FIG. 2 goes further into the ground than the foundation shown in FIG. 1 to provide greater resistance to the forces of high winds. The column 2 passes through the foundation 4 into a column pad 19 beneath the foundation 4 to provide a strong footing in which to anchor the column.

The inside upper portion of the dome 1 includes at it top center a thickened region 5A, referred to as the dome sleeve. The dome sleeve has a centrally located and vertically oriented port 5B, referred as the dome sleeve port. The dome sleeve port has a top opening located at the top center of the dome and a bottom opening located at the bottom center of the dome sleeve. The column, which typically has a circular cross section, passes through the dome sleeve port enabling the dome to slide up and down the on the column.

FIG. 3 is a top view of the dome 1, showing its circular outline and the location of the column 2 at the center of the dome. Since the dome is guided in its movement by the column, it experiences the most mechanical stress in the area surrounding the column. The column sleeve, as shown in FIG. 2, is generally thicker then the remainder of the dome material to add strength to the dome in the region where it surrounds the column. Also shown in FIG. 2 is an upper locking port 12A which passes through both the dome sleeve and the column at it's upper end in a radial direction with respect to the column. The locking port 12A accepts a locking bolt 6 that is secured in place by a nut 7. The purpose of the locking bolt 6 is to secure the dome to the column in the dome's upper position above the base, as shown in FIG. 2.

To set bolt 6 in place, it is necessary to support the dome temporarily in it's upper position. This can be done by employing springs 8A and 8B which are located on either side of the column near it's upper end. As can be seen in FIG. 2, the springs are relative thin ribbons shown in cross section and have a specific configuration to enable them to carry out their function. This configuration can be traced by beginning at their lower ends and then proceeding upwards. The springs first taper outward and away from the column and then curve in sharply towards the column. At the upper end of the springs the column contains spring ports 8C and 8D to allow the upper end of the springs to penetrate into the column and permit the dome sleeve to pass over the springs. These springs are typically formed of spring steel and are depressed inwardly towards the column by the dome sleeve through cam action as the dome sleeve is raised or lowered past the springs. An alternative equivalent is to manually depress these springs as necessary to permit the dome sleeve to pass the springs. The springs return to their original outwardly extended position after the column sleeve has passed their location on the column. In their outwardly extended position, the springs extend out under the dome sleeve and provide the desired temporary support to hold the dome in it's upper position, enabling the bolt 6 to be inserted with little difficulty.

In the event of an impending storm, the occupants enter the lower portion of the shelter. To lower the dome, the nut 6 and the bolt 7 are removed and a downward force is applied to the dome forcing the column sleeve past spring locks 8A and 8B. These spring locks are again compressed into the column to permit the dome sleeve to pass. Once the dome has been fully lowered on to the base wall and the occupants are safely inside, the dome can be secured in place. The securing of the dome is accomplished in three ways. The first way is by again using the bolt 6 to pass through the sleeve and the column, but at this lower position of the dome, a lower locking port 12 B is used. This port also passes through the column in a manner similar to locking port 12A. Alternatively, a second bolt 7B and a second nut 6A may be used in the locking port 12B.

The second way of securing the dome involves the use of projections 10A and 10B located at the lower inside edge of the dome and threaded studs 11A and 11B which are mounted into the base and project upward from the base. These studs are positioned on the base to pass through holes 10C and 10D which are located in tabs 10A and 10B, respectively. Nuts, such as wing nuts 11C and 11D, that can be tightened without the use of tools, are typically provided to secure the dome by applying them to the studs 11A and 11B after the studs have passed through the holes in the tabs of the dome.

In the third way, a dog and platform type of securing device is employed. This system for securing the dome in place is described in greater detail below.

As is understood by those skilled in the art, many equivalents may be substituted for a nut and bolt or studs and wing nuts to secure the dome in position without departing from the spirit or scope of the invention. Any of many known similar mechanical securing means, such as a shaft and cotter pin, may serve the same purpose, the nut, bolt, stud and wing nut being expressly stated herein only as representative terms intended to cover such equivalent securing means.

In an alternative embodiment of the invention, the dome is raised and lowered by lines and the dome. This alternative type of dome positioning and securing mechanisms is illustrated in FIGS. 2 and 3 and 4A through 4C. Referring first to FIG. 3, it can be seen that this alternative type of dome movement mechanism consists of a smooth rod 20 that is attached to the inside of column 2 near its top, and this rod spans the distance across the center of the column. Riding on this rod are two lines 21A and 21B. These lines are again shown in FIG. 2, where it can be seen that one end of line 21A and 21B is attached to the dome at points 21C and 21D, respectively. The column is configured to form a peak or triangular shape at its top where the rod 20 is connected to the column. The peak 2A is shown in the side view of FIG. 5A and in the front view of FIG. 5B. The triangular shape can be seen in the front view of FIG. 5B. Two peaks are caused by cutting the column in this manner, with the second peak 2B being located directly opposite the first peak 2A.

This arrangement provides clearance between the lines 21A and 21B and the edge of the column, as these lines go between the rod 20 and the points of attachment of the lines to the dome at 21C and 21D. An equivalent alternate arrangement is obtained by providing ports at the top of the column, with one port located on the opposite side of the column from the other, and passing lines 21A through one port and line 22B through the other port on their way to the points of attachment on the dome at 21C and 21D.

The unattached ends of the lines are placed within the column and emerge through ports 25A and 25B, located approximately midway down the column from the top. The lines are not shown running completely through the center of the column in FIG. 2 to avoid cluttering this area of the drawing; however, it should be understood that there is no discontinuity in the lines from the top of the column until the lines emerge from ports 25A and 25B. Ports 25A and 25B are rendered smooth to avoid fraying the lines as they are drawn through these ports. In close proximity to the ports 25A and 25B are line securing hitches 24A and 24B which are disposed on either side of the column. These securing hitches are merely brackets positioned vertically and secured to the column at their midpoints, while their ends are spaced away from the column to provide a means for winding and tying the lines to these bracket ends.

To raise the dome, lines 21A and 21B are drawn through ports 25A and 25B. This causes the ends of these lines at attachment points 21C and 21D to draw the dome upward because these lines pass around the rod 20 which is located near the highest point on the column. The lines can then be attached to the hitches 24A and 24B, securing the column at it raised position. With this system of raising the dome, the dome can be set at any point along the column desired.

To lower the dome, the lines are simply released and allowed to pass through ports 25A and 25B. The weight of the dome draws the lines through these ports. The dome can be lowered to the dome's lower position or any point between the dome's raised and lower position.

The word "smooth" as used herein in connection with rod 20, ports 25A and 25B and any other ports intended to pass lines, means generally smooth to the touch, and free of burrs or rough edges. The purpose in all cases where smooth is referred to herein is to provide a surface that is sufficiently smooth to permit a line under the tension of raising the dome to repeatedly pass over such surfaces without fraying, or sustaining appreciable wear.

As noted above, an alternative mechanism for securing the dome to the base wall is shown in FIGS. 4A through 4C. It consists principally of a rod-like handle or dog 26A and a platform 26B. The platform includes a ramp 26C which rises from the bottom of the platform on an incline to the top of the platform, as shown in FIG. 4C. The dog 26A includes a shaft 26D which projects downward to a first mounting surface 26F, where it is rotatable attached to this mounting surface. The platform is mounted on a second mounting surface 26E which is separated from 26F.

In the operation of this securing mechanism, one end of the dog extends over the platform. The height of the dog shaft is slightly less than the height of the platform. The dog can be turned on its shaft to ride up the ramp and because of the shaft's being slightly less in height than the platform, the dog applies pressure to the platform. This mechanism can be used to secure the dome to the base wall by mounting a dog on the base wall and mounting the platform on a dome projection, such as projection 10A. As many dogs and platforms can be installed as necessary, however, four dogs and four platforms are usually sufficient.

It is generally known that the dog can be mounted on a first surface and the platform on a second adjacent surface, or the positions can be reversed with the dog mounted on the second surface and the platform on the first, if certain conditions are accepted. These reversed positions of the dog and platform are considered alternative equivalents. A first example is the dog is mounted on the inside of the base wall and the platform is mounted on the door. In that case, the door must open inward in order for the dog to apply pressure to the door to secure it in its closed position in the base wall. If instead in a second example, the dog is mounted on the inside of the door, facing the inside of the safe space, rather than on the base wall, then the door would ordinarily open outward for the dog to be able to secure the door to the base wall in its closed position. The condition which must be accepted for the second example is obviously a reversal of the direction in which the door opens.

Once inside the dome, the occupants can receive a fresh supply of air through vent ports 13A and 13B which are generally located on opposite sides of the base wall 3 and pass through the base wall as shown in FIG. 2. Locating these ports on opposite sides of the base wall helps to provide cross ventilation within the shelter. These ports are protected from raid water by shields 13C and 13D which project outwardly from just above these ports and downwardly in front of the ports, but have their lower side open to permit air to flow through of these ports.

Ports 13A and 13B are supplied with caps 14A and 14B, respectively, which are located on the inside of the shelter and are capable of being attached to the inside terminations of ports 14A and 14B to close off air flow, if it becomes excessive, and to close off water flow through these vents in the event a storm becomes sufficiently strong that the shields 13C and 13D are insufficient to prevent rain water from entering these ports. Usually when a storm is blowing sufficiently hard to force rain water through a vent port, it comes only from the windward side, allowing the occupants to continue to receive a fresh air supply from the vent port located on the opposite or leeward side of the base wall.

A drain pipe 18, having a drain port 18A at its lower end, passes through the foundation of the shelter and into the soil below to provide drainage for the shelter. A cap 18B is located inside of the shelter to enable it to be attached to the top of the drain pipe to close off this pipe. The drain pipe 18 is located in an area in the foundation that is lower than the remainder of the foundation to permit it to accept and drain off water that may have accumulated in the shelter. The cap 18B can be used to prevent water from coming back into the shelter in the event there is a high water table in the area.

Water accumulated within the shelter may alternatively be drawn off through drain pipes 22A and 22B which are located in the lower portions of the base wall 3 at the inside floor level of the foundation as shown in FIG. 2. The floor level within the shelter is usually above the outside ground level 17, making it possible for these drain pipes to draw off water from the floor of the shelter. Although not shown, these pipes may be capped, as described above in connection with the use of cap 18B with pipe 18, to prevent wind or wind driven rain from entering the shelter through pipes 22A and 22B during a storm.

To provide easy access for a wheelchair, a door 27 is placed in the base wall 3 as shown in FIG. 2. This door is either hinged and secured at one side by means such as the dog and platform mechanism shown in both FIGS. 2 and 4A through 4C, or it is entirely secured in place by the dog and platform type mechanism placed on both the left and right sides of the door. This later arrangement permits total removal of the door and thereby provides improved access to the shelter, a future especially desirable in accommodating disabled persons. A weather sealed window 9 is placed in the dome to provide light within the dome and to permit viewing the weather conditions outside the dome from the inside of the dome. This window is preferably made from clear high impact plastic to protect the personnel within the dome from flying debris.

The shelter need not remain idle when there is fair weather. A circular table top 23 is mounted to the column 2 above the level of the base wall, as shown in FIG. 2, to convert the shelter into a gazebo. Chairs are placed inside the base wall and about the inside of the shelter to provide seating about the table top. The dome is raised to its upper position and locked in place, providing shade for the occupants.

Having described my invention I claim:

1. A shelter design to provide an internal safe space in which to house and protect human life from the dangers of storms having high velocity winds and extremely heavy rain fall, such as hurricanes, comprising:
   (a) a foundation resting on and covering a portion of the earth, said foundation forming a floor for said shelter,
   (b) a base wall being closed on itself and defining said safe space within the closure of said base wall, said base wall lying within the area of and resting on said foundation and said base wall being secured to said foundation,
   (c) a column positioned vertically and having an upper and lower end, said column generally passing through the center of the safe space and also passing through said foundation at said column's lower end, and said column extending upward above the base wall at said column's upper end,
   (d) a dome extending about the top of said base wall to provide a cover to said safe space, said dome having a dome port passing in a vertical direction through it's center, said dome port having an aperture that is configured to pass closely about said column and said column extending through said dome port to enable said dome to be raised to an upper position above said base wall to provide access to said safe space, and lowered to a lower position where said dome rests on said base wall to provide overhead closure to said safe space, said dome remaining centered about said column while being raised and lowered, and
   (e) means for detachably connecting said dome to said base wall to enable said dome to be raised to its upper position when detached from said base wall to provide access to said safe space and to be lowered on to said base wall and connected to said base wall to secure said safe space from intrusion of wind, rain and flying debris occurring during a storm.

2. A shelter as claimed in claim 1 wherein said means for detachably connecting said dome to said base wall includes tabs having holes, studs which can pass through said holes in said tabs and nuts for threading on said studs, said tabs being connected to said dome and being located on the inside of said dome in proximity to said base wall, said studs projecting from said base wall and being aligned to pass through said holes in said tabs when said dome is placed in its lower position on said base wall, and said nuts being capable of being threaded on said studs by the occupants of said shelter to secure said dome to said base wall.

3. A shelter as claimed in claim 1, further comprising a dome sleeve located on the inside of the dome and attached to the center of the dome, said dome sleeve typically being formed of the same material as the dome and extending vertically downward and including at its center an extension of said dome port to enable said column to pass through the dome sleeve and the center of the dome, said dome sleeve providing strength to the dome in the area where it slides about said column.

4. A shelter as claimed in claim 3, further comprising first means for detachably connecting said dome to said column including a first bolt and a first nut for threading on said first bolt and a lower locking port passing through said dome sleeve and said column in a generally radial direction with respect to said column when said dome is in its lower position resting on said base wall, said lower locking port accepting said first bolt to secure said dome to said column and said first bolt accepting said first nut on its threaded end to secure said first bolt in said lower locking port.

5. A shelter as claimed in claim 4, further comprising second means for detachably connecting said dome to said column, said second means including a second bolt and a second nut for threading on said second bolt, and an upper locking port passing through said dome sleeve and said column in a radial direction with respect to said column when said dome is in its upper position, said upper locking port accepting said second bolt to secure said dome to said column and said second bolt accepting said second nut on its threaded end to secure said second bolt in said upper locking port.

6. A shelter as claimed in claim 1, further comprising means for temporarily latching said dome in said upper position including a spring and a spring port in said column, said spring being in the form of a ribbon and said spring being configured to have an upper and a lower portion, said upper portion of said spring having two ends, one end adjacent said column and the other end away from said column, said upper portion of said spring extending generally radially outward from said column, but with a downward taper as it extends away from said column, said lower portion of said spring having an upper and lower end, said lower end being connected to said column a distance below said upper portion of said spring and said upper end of said lower portion of said spring being connected to said upper portion of said spring at the end of said upper portion of said spring away from said column, said lower portion of said spring extending generally linearly outward and upward from said column to connect to said upper portion of said spring, said spring port in said column being located directly adjacent the end of said upper portion of said spring closest to said column, and said spring port having an aperture sufficiently wide to accept said upper portion of said spring in said column when said spring is depressed into said column, the bottom of said dome sleeve resting on the upper portion of said spring for temporary support when said dome is in its the upper position, said dome sleeve depressing said spring into said spring port in said column by means of cam action of the dome sleeve against the downward taper of said upper portion of said spring when downward pressure is exerted against said dome to enable said dome and dome sleeve to pass said spring and descend to the lower position of said dome, said spring again being depressed into said spring column port by means of cam action against the outward taper of the lower portion of said spring by said dome sleeve when upward pressure is applied to said dome to permit said dome sleeve to pass said spring on said column and move said dome to its upper position.

7. A shelter as claimed in claim 1, wherein the height to which said column extends above said base wall is a minimum of that necessary to equal the height at which the top center of said dome is at when said dome is in its upper position to provide support to said dome in its upper position.

8. A shelter as claimed in claim 1, wherein said dome further comprises a lip extension at its lower edge generally extending downward and over the outside of the base wall about the periphery of the base wall to direct rain water from the top of the dome away from the dome-base wall interface to keep the safe space within the shelter dry during periods of driving, heavy rainfall.

9. A shelter as claimed in claim 1, wherein said dome is fabricated from material known to withstand wind, rain, and the impact of flying debris, said materials including steel, aluminum and high impact plastic.

10. A shelter as claimed in claim 1 wherein said foundation is a slab of concrete covering the earth in the safe space enclosed by said base wall and extending beneath said base wall.

11. A shelter as claimed in claim 10 wherein said foundation further includes a footing beneath said slab in the area that is under said base wall to provide greater support and anchoring for said base wall, and said shelter further includes a column pad beneath said slab and said column to provide anchoring for said column.

12. A shelter as claimed in claim 1 wherein said base wall includes an air vent port extending from the inside of said base wall to outside of said base wall.

13. A shelter as claimed in claim 12, further comprising means for closing off said air vent port from inside said safe space to prevent rain water from entering said safe space.

14. A shelter as claimed in claim 12, further comprising a rain shield over the outside opening of said air vent port to direct rain water away from said air vent port, said rain shield being formed of material impervious to water and being connected above said air vent on the outside of said base wall and extending down and away from as well as below said air vent port, with a shield opening being located on a lower side of said rain shield below said air vent port said shield opening facing downward to permit air to enter while simultaneously preventing rain water from entering.

15. A shelter as claimed in claim 1 wherein said foundation includes a first drain pipe extending from the inside of said safe space through said foundation to the earth below the foundation to drain water within said safe space into the earth, and wherein said apparatus further includes means to close off said drain pipe to prevent the back flow of ground water into said safe space.

16. A shelter as claimed in claim 1, wherein said dome includes a closed and weather sealed window for viewing outside weather conditions and for providing light within said safe space, said window being formed of high impact clear plastic.

17. A shelter as claimed in claim 1 further comprising a second drain pipe passing through the base wall at a level that is generally in line with the upper surface of the inside floor of said shelter.

18. A shelter as claimed in claim 1 further including a door with a hinge located in said base wall to facilitate access to the inside of said shelter, by eliminating the need to ascending the base wall.

19. A shelter as claimed in claim 18, further including a means for securing said door to said base wall including a first dog and platform securing device comprising a dog rotatably mounted to the surface of said base wall adjacent said door, said dog being generally rotatable in a vertical plane, and said platform which includes a ramp being mounted to said door in a location which permits said dog to ride up the ramp to the top of the platform and apply pressure on said door to secure said door to said base wall.

20. A shelter as claimed in claim 1, further including a door without a hinge, wherein the means for securing said door to said base wall includes only a plurality of dog and platform type securing device, making possible easy removal of said door from said base wall and thereby facilitating entry of disabled persons into said shelter.

21. A shelter as claimed in claim 1, further comprising a table top mounted to and about said column to convert said shelter to a gazebo for use in fair weather.

22. A shelter as claimed in claim 1 further comprising means for securing said dome to said base wall which includes a second dog and platform securing device in which the dog is rotatable mounted to the top surface said base wall, said dog being rotatable generally in a horizontal plane, and the platform is formed on a dome projection that is located on the lower inside edge of said dome and extends inward from said dome, said platform including a ramp and said platform being positioned generally under said dog to enable said dog to ride up the ramp to said platform and apply pressure against said dome projection to secure said dome to said base wall.

23. A shelter as claimed in claim 1 further comprising means for moving said dome up and down on said column which includes a smooth bar placed diametrically across the inside top portion of said column, a first and a second line port generally located on opposite side of said column generally in the midsection of said column, said first and second line ports passing from the outside to the inside of said column and said first and second line ports having generally smooth surfaces, a first and a second line securing bracket attached to said column near said first and second line ports respectively, a first and a second line, each being attached at a first end of each line to the top of said dome, with one line being attached generally to a side opposite that to which the other line is attached, each line being passed over said smooth bar, down through the inside of the column and then each of said lines passing out of one said first and second line ports, with the second end of each line being secured to one of said first and second line securing brackets to enable said first and second lines to be drawn through said first and second line ports by the occupants of said shelter to raise said dome and to release said lines through said first and second line ports to lower said dome and to hold said lines and said dome at one point in elevation by securing said lines to said securing brackets.

24. A shelter as claimed in claim 23 wherein said column top is triangular in shape forming two peaks, with one peak being diametrically opposite the other, said peaks supporting said smooth rod, and said triangular shape providing clearance for said lines as they are dressed down from said smooth bar to the top of said dome at their first ends.

25. A shelter as claimed in claim 1 wherein said base wall is circular in plan view generally matching diameter the maximum diameter of said dome.

* * * * *